Patented Sept. 23, 1941

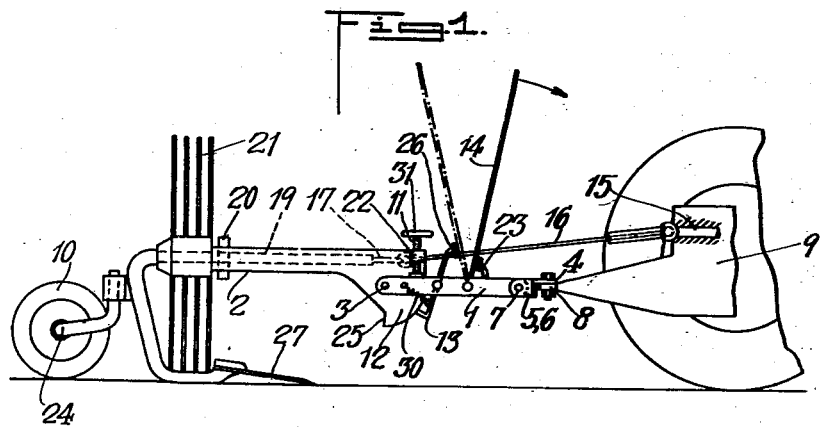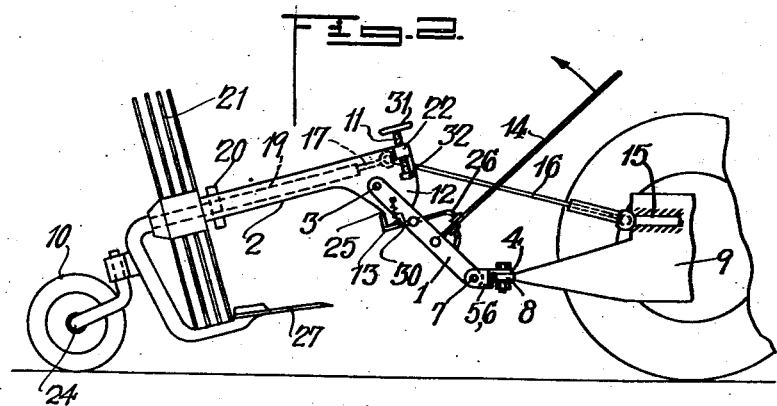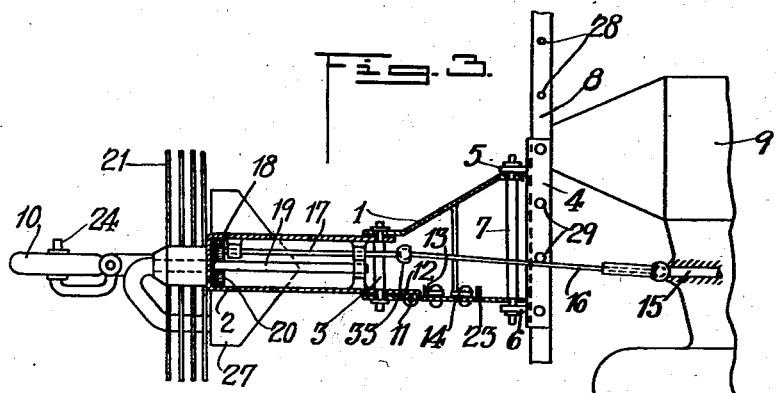

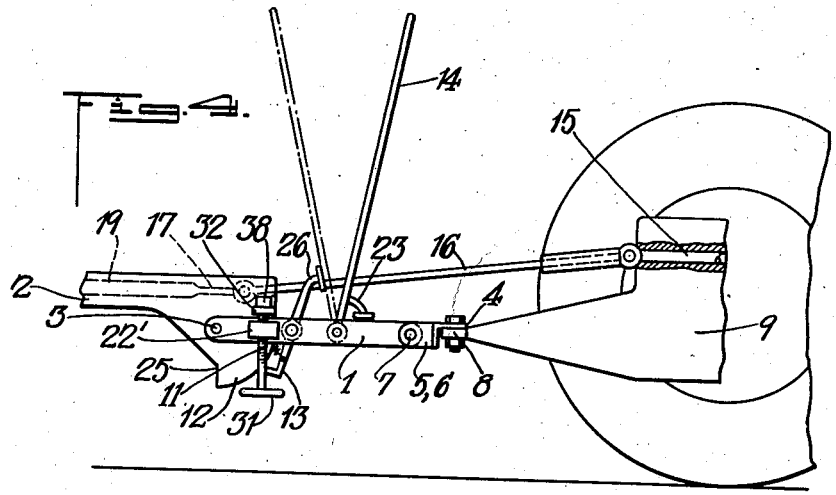
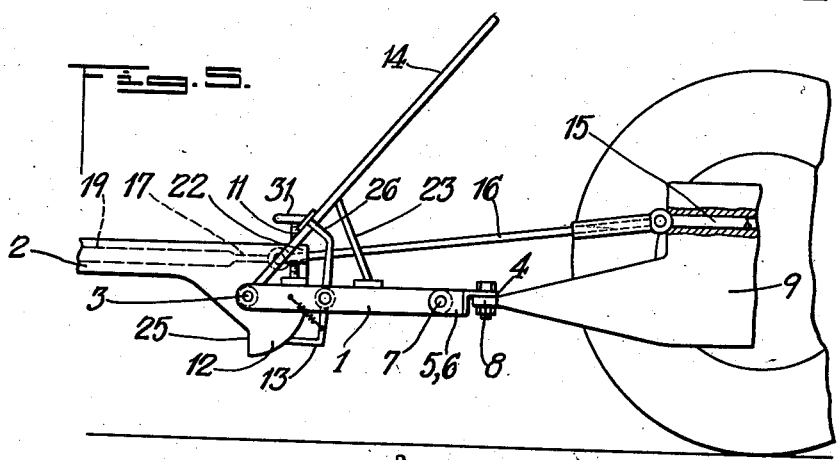
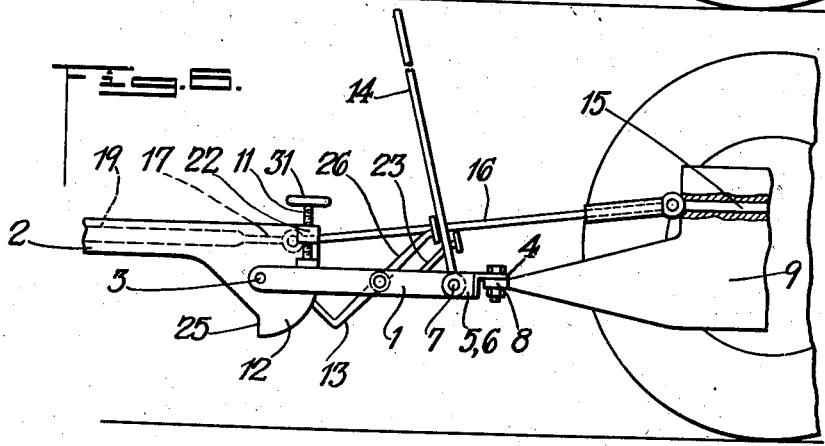

2,256,563

UNITED STATES PATENT OFFICE 2,256,563

ROOT HARVESTING MACHINE

Heinrich Kamplade, Mannheim, Germany, assignor to Heinrich Lanz Aktiengesellschaft, Mannheim, Germany Application January 13, 1939, Serial No. 250,669
In Germany January 17, 1938

6 Claims. (Cl. 55—56)

The present invention relates to improvements in root, more particularly, potato-harvesting-machines adapted to be attached to a tractor and having a power take-off driven spinner.

Potato harvesters having a running gear and being power take-off driven of conventional construction are laterally movable and are very long whereby turning and maneuvering is made difficult and the share is inaccurately guided particularly when operating on a hill. Motor driven cultivators are known, the frame of which is directly movably connected with the rear axle of the tractor. In this case the tractor carries the total weight of the working apparatus whereby objectionable vibrations are produced which cause great wear and tear on the lifting devices.

It is an object of the present invention to provide a harvesting machine of such construction as to avoid the above-mentioned shortcomings. According to the present invention the frame of the harvesting apparatus proper is directly articulated to the tractor and swingable in a plane only which is perpendicular with respect to the plane of the track; the harvesting apparatus proper can swing in said plane about the joint at which it is connected with the tractor in any of its operating positions. In order to limit the swinging motion in a desired manner a support wheel is provided at the rear end of the apparatus. According to the present invention the frame of the harvester comprises two parts which are movably connected with one another; for transport purposes said two parts form an angle. One part of the two-piece frame carries a latch member which is adapted to engage a lock member in the other part and can be disengaged from said lock member by means of a lever for lifting the joint into rest or transport position in which position said two parts form an angle.

Further and other objects of the present invention will be hereinafter set forth in the accompanying specification and shown in the drawings which, by way of illustration, show what I now consider to be a preferred embodiment of my invention.

In the drawings which show by way of example the embodiment of my invention in a one row potato harvester Figure 1 is a schematic side view of the harvester in operating position, Figure 2 is a schematic side view of the harvester in rest or transport position, Figure 3 is a schematic top view of the harvester shown in Fig. 1, Figures 4, 5 and 6 show modifications of the mechanism for changing the harvester from rest position to operating position and vice versa.

Like parts are designated by like numerals in all figures of the drawings.

The frame of the harvester is made up of carrying members 1 and 2 which are secure against twisting and which are movably interconnected by means of a horizontal bolt 3; the front end of the frame carries a connecting rail 4 which is articulated by means of lashes 5 and 6 and the horizontal bolt 7 to the front end member 1. Rail 4 is removably connected with a corresponding rail 8 of the tractor 9 and is rigidly connected therewith in a horizontal plane. The position of rail 4 with respect to rail 8 and the tractor can be changed; for this purpose a plurality of surplus holes 28 are provided in rail member 8 for accommodating bolts 29 which interconnect rails 4 and 8. The rear part 2 of the frame of the harvester which carries the harvesting devices proper, namely the share 27 and the spinner 21, is supported by means of the support wheel 10. The fore end of the carrying member 2 is provided with a segment 12 having a locking surface 25 which is adapted to receive the end of one arm of the two arm latch lever 13 which lever is swingably connected with the forward carrying member 1 and pulled into a position to engage segment 12 and surface 25 by means of a spring 30. Arm 26 of latch lever 13 is abuttingly engaged by a lever 14 which is fulcrumed to member 1 and adapted to actuate the latch member 13. The foreward end of the carrying or frame member 2 is provided with a boss 22 having a threaded hole through which the threaded adjusting spindle 11 extends. The upper end of spindle 11 is provided with a hand wheel 31 and the lower end with an abutment 32 which is adapted to abuttingly engage the front carrying member 1. The axle 19 of the spinner 21 carries a wheel 20 having an internal gear which is in mesh with the gear wheel 18 connected to the drive shaft 17 which shaft is connected by means of a universal joint 33 with the intermediate shaft 16; the latter is adapted to be connected with the power take-off 15 of the tractor 9.

In operating condition of the harvester shown in Figs. 1 and 3, abutment 32 rests on the front carrying member 1 and limits the operating depth of the share 27 which depth can be adjusted by manipulation of spindle 11 or rather wheel 31; due to their weight and the action of the share on the ground engagement of abutment 32 and member 1 is assured and relative position of members 1 and 2 in the joint formed about bolt 3 automatically determined and maintained.

Lifting of the harvester into the rest position shown in Fig. 2 is accomplished by pulling lever 14 against a projection 23 connected with member 1 whereby frame part 1 is swung upward about bolt 7. The frame 1, 2 thereby folds upward in the joint 3 and member 2 swings about axle 24 of the support wheel 10 which, at the same time, is moved closer toward the tractor. Latch member 13, due to the action of spring 30, snaps into engagement with the locking surface 25 of segment 12; arm 26 of the latch member engages thereby lever 14.

In order to change the harvester from rest into operating position, lever 14 must be moved backward and counterclockwise; latch 13 is thereby also moved counterclockwise against the action of spring 30 and lock part 12, 25 of member 2 disengaged. Due to its own weight the frame 1, 2 automatically straightens itself out until abutment 32 engages member 1. If the share 27 comes to rest on the surface of a potato dam and abutment 32 has not yet engaged member 1, the share digs itself into the ground and moves member 2 downward until part 32 engages member 1 and the share is held in the desired operating depth.

The harvester, in operating as well as in rest or transport position, can freely swing upward and downward about the bolt 7. The operation of the share is thereby equalized and independent from the position of the tractor. At abnormal pressure on the share the harvester can fold upward.

According to Figure 4, the adjustable abutment device 11, 31, 32 may also be connected by means of a boss 22' with the forward member 1 instead of with the rear member 2. In this case the rear member 2 is provided with a projection 38 against which abutment 32 comes to rest when the harvester is in operating position.

The abutment 23 may be fixed to lever 14 instead of to member 1.

As shown in Fig. 5 operating lever 14 may be hinged to bolt 3 instead of to a separate bolt in member 1. In this case arm 26 of lever 13 is of different configuration in order to be pulled counterclockwise by and upon counterclockwise movement of lever 14.

If, as shown in Fig. 6, lever 14 is hinged to bolt 7 abutment 23 connected to member 1 extends forward of lever 14 in order to be engaged by the lever when it is moved clockwise for lifting the harvester into rest position.

All modifications shown materialize the important feature of the present invention, namely the lifting of the harvester into rest position and simultaneously the unlocking of latch 13 by means of hand lever 14.

While I believe the above described embodiments of my invention to be preferred embodiments, I wish it to be understood that I do not desire to be limited to the exact details of method, design and construction shown and described, for obvious modifications will occur to a person skilled in the art.

I claim:

1. A root harvester adapted to be operated by a tractor, said harvester having a folding frame including two frame members and a hinge means foldably interconnecting said two members, a substantially horizontally positioned pin member swingably interconnecting one of said frame members and the tractor, said hinge means and said pin member being adapted to secure folding of said frame and swinging of said harvester relatively to the tractor in a substantially vertical plane and to prevent movement of said harvester relatively to the tractor in a plane parallel to the ground, and a support wheel laterally swingably and vertically unmovably connected with the other of said frame members for supporting the rear end of said folding frame and limiting the swinging motion of said frame.

2. A root harvester adapted to be operated by a tractor, said harvester including harvesting means, a foldable frame comprising two main frame members, hinge means foldably interconnecting said two members and providing for folding said frame in a substantially vertical plane, one of said members being provided with substantially horizontal hinge means for hinging said member to the tractor and providing for vertical swinging motion of said member with respect to the tractor and preventing lateral movement of said member relatively to said tractor, the other of said members carrying said harvesting means, and support means vertically unmovably connected with and supporting the rear end of said other member on the ground, said two main frame members being substantially in line with one another when said harvester is in operating position and forming an angle and being both inclined with respect to the ground when said harvester is in rest position.

3. A root harvester adapted to be operated by a tractor, said harvester including harvesting means, a foldable frame comprising two main frame members, hinge means foldably interconnecting said members and providing for folding said frame in a substantially vertical plane, one of said members being provided with substantially horizontal hinge means for hinging said member to the tractor and providing for vertical swinging motion of said member with respect to the tractor and preventing lateral movement of said member relatively to said tractor, the other of said members carrying said harvesting means, support means connected with and supporting the extreme rear end of said other member on the ground, and latch means connected with one of said members and being adapted to engage the other of said members when said frame is in folded condition and locking said frame in folded condition for transport purposes.

4. A root harvester adapted to be operated by a tractor, said harvester including harvesting means, a foldable frame comprising two main frame members, hinge means foldably interconnecting said members and providing for folding said frame in a substantially vertical plane, one of said members being provided with substantially horizontal hinge means for hinging said member to the tractor and providing for vertical swinging motion of said member with respect to the tractor and preventing lateral movement of said member relatively to said tractor, the other of said members carrying said harvesting means, support means connected with and supporting the extreme rear end of said other member on the ground, and an adjustable abutment connected with one of said members and being adapted to engage the other of said members when said frame is in unfolded condition for harvesting purposes.

5. A root harvester adapted to be operated by a tractor, said harvester including harvesting means, a foldable frame comprising two main frame members, hinge means foldably interconnecting said members and providing for folding said frame in a substantially vertical plane, one of said members being provided with substantially horizontal hinge means for hinging said member to the tractor and providing for vertical swinging motion of said member with respect to the tractor and preventing lateral movement of said member relatively to said tractor, the other of said members carrying said harvesting means, support means connected with and supporting the extreme rear end of said other member on the ground, latch means connected with one of said members and being adapted to engage the other of said members when said frame is in folded condition and locking said frame in folded condition for transport purposes, and operating means connected with one of said members for folding said frame and being adapted to engage said latch means for releasing said latch means from the other of said members for unfolding said frame.

6. A root harvester adapted to be operated by a tractor, said harvester having a folding frame including two main frame members and a hinge means foldably interconnecting said two members and providing for folding said frame only in a substantially vertical plane, other hinge means vertically swingably and laterally unswingably connecting one of said frame members with said tractor, said harvesting means being connected with and supported by said other frame member, support means vertically unmovably connected with and supporting said other member on the ground, and adjustable connecting means associated with said other hinge means and with said tractor for rigidly yet adjustably connecting said other hinge means and said tractor and for rendering the position of said other hinge means laterally adjustable with respect to the tractor.

HEINRICH KAMPLADE.